US010536886B2

(12) United States Patent
Cai

(10) Patent No.: US 10,536,886 B2
(45) Date of Patent: Jan. 14, 2020

(54) NETWORK SHARING METHOD, ELECTRONIC DEVICE AND SYSTEM

(71) Applicant: Lenovo (Beijing) Limited, Beijing (CN)

(72) Inventor: Mingxiang Cai, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/380,003

(22) Filed: Dec. 15, 2016

(65) Prior Publication Data

US 2017/0181047 A1 Jun. 22, 2017

(30) Foreign Application Priority Data

Dec. 18, 2015 (CN) .......................... 2015 1 0958669
Dec. 18, 2015 (CN) .......................... 2015 1 0959124
Dec. 18, 2015 (CN) .......................... 2015 1 0959357

(51) Int. Cl.
*H04W 36/08* (2009.01)
*H04W 36/28* (2009.01)
*H04W 36/00* (2009.01)

(52) U.S. Cl.
CPC ........... *H04W 36/08* (2013.01); *H04W 36/03* (2018.08); *H04W 36/28* (2013.01)

(58) Field of Classification Search
CPC .............................. H04W 36/08; H04W 36/28
See application file for complete search history.

(56) References Cited

U.S. PATENT DOCUMENTS 7,774,013 B2 * 8/2010 Backes ................. H04L 47/125
455/522
7,813,733 B2 * 10/2010 Cromer ................. H04W 36/30
370/331
(Continued)

FOREIGN PATENT DOCUMENTS

CN 102711200 A 10/2012
CN 102711282 A 10/2012
(Continued)

*Primary Examiner* — Gregory B Sefcheck
(74) *Attorney, Agent, or Firm* — Ference & Associates LLC

(57) ABSTRACT

A network sharing method is provided for a first electronic device, the first electronic device having a communication module that establishes a connection with at least one second electronic device through the communication module working in a second working mode. The first electronic device may receive access information of available access point from at least one second electronic device, where the access information is searched by the at least one second electronic device while maintaining the second communication with the first electronic device. The second communication connection with the at least one second electronic device may be disabled by the first communication module and the first communication module may be switched from the second working mode to first working mode. An embodiment may thereafter connect to the available access point through the communication module working in the first working mode such that the Internet is accessed through the available access point. Other embodiments are described and claimed.

15 Claims, 8 Drawing Sheets

(56) References Cited

U.S. PATENT DOCUMENTS

| | | | | |
|---|---|---|---|---|
| 8,000,298 | B2* | 8/2011 | Tsutsumi | H04W 36/08 370/328 |
| 8,446,933 | B2* | 5/2013 | Wentink | H04W 40/10 375/217 |
| 8,763,082 | B2* | 6/2014 | Huber | G06Q 20/1235 726/3 |
| 9,319,959 | B2* | 4/2016 | White | H04W 36/30 |
| 9,549,337 | B2* | 1/2017 | Wang | H04W 28/0236 |
| 9,578,595 | B2* | 2/2017 | Hegde | H04W 48/16 |
| 9,661,546 | B2* | 5/2017 | Johansson | H04W 36/30 |
| 9,674,048 | B2* | 6/2017 | Cherian | H04L 41/28 |
| 9,820,117 | B1* | 11/2017 | Tran | H04W 4/21 |
| 10,085,193 | B2* | 9/2018 | Baghel | H04W 28/08 |
| 10,148,769 | B2* | 12/2018 | Lepp | H04L 67/16 |
| 2011/0103359 | A1 | 5/2011 | Cho et al. | |
| 2014/0133355 | A1* | 5/2014 | Shu | H04W 48/16 370/254 |
| 2014/0140242 | A1 | 5/2014 | Xiao et al. | |
| 2014/0244839 | A1* | 8/2014 | Yoon | H04W 36/26 709/224 |
| 2014/0286316 | A1* | 9/2014 | Park | H04W 76/16 370/332 |
| 2015/0189557 | A1* | 7/2015 | Touati | H04W 36/0066 370/332 |
| 2016/0029393 | A1* | 1/2016 | Qian | H04W 36/0022 370/329 |

FOREIGN PATENT DOCUMENTS

| | | |
|---|---|---|
| CN | 104093148 A | 10/2014 |
| CN | 104144515 A | 11/2014 |
| CN | 203942111 U | 11/2014 |
| CN | 104243715 A | 12/2014 |
| CN | 104703264 A | 6/2015 |
| CN | 104735814 A | 6/2015 |
| CN | 104902532 A | 9/2015 |

* cited by examiner

NETWORK SHARING METHOD, ELECTRONIC DEVICE AND SYSTEM

CLAIM FOR PRIORITY

This application claims priority to Chinese Application Nos. 201510959357.7, 201510959124.7, and 201510958669.6, each of which was filed on Dec. 18, 2015, and the contents of which are each fully incorporated by reference herein.

TECHNICAL FIELD

The subject matter relates to the technical field of network sharing, and more particularly, to a network sharing method, an electronic device and a system.

BACKGROUND

At present, various electronic devices, such as, a personal computer, a mobile terminal, a tablet computer, or the like, are widely used. With the rapid development of the Internet technologies, people's work and life are increasingly dependent upon the Internet. For example, people generally need to access the Internet anytime and anywhere via the above various electronic devices to browse webpages, and communicate via text, audio and even video, shopping, entertainment and the like.

When an electronic device is incapable of accessing a mobile communication network provided by a mobile communication network operator, for example, a wide area network (WAN), to access the Internet, and when a Wi-Fi access point is not available in the vicinity of the electronic device to access the Internet, if another electronic device capable of accessing the WAN is present in the vicinity of the electronic device, the electronic device may request a user of the another electronic device to manually enable a Wi-Fi hotspot function, to enable the electronic device to further access the Internet for browsing the Internet by means of connecting to the Wi-Fi hotspot of the another electronic device. The above scenario is one of the universal manners of sharing the network among current electronic devices. In this manner, each time a network is shared, the user is required to manually enable the Wi-Fi hotspot, causing inconvenience to the user.

In addition, when another electronic device enables the Wi-Fi hotspot and two electronic devices establish a Wi-Fi hotspot connection, the electronic device working as the Wi-Fi hotspot may not simultaneously search out the Wi-Fi access point in the current environment. As such, even if a free Wi-Fi access point available for access to the Internet is newly present in the current environment, the electronic device may not instantly search out and automatically connect to the free Wi-Fi access point. Therefore, mobile traffic of the user is wasted, such that the user's cost of accessing the Internet is increased, resulting in a poor user experience.

BRIEF SUMMARY

One aspect provides a network sharing method, applicable to a first electronic device, the first electronic device comprising a first communication module, wherein the first electronic device establishes a second communication connection with at least one second electronic device through the first communication module working in a second working mode, and the method comprising: receiving access information of an available Internet access point from the at least one second electronic device, wherein the access information is searched by the at least one second electronic device while maintaining the second communication with the first electronic device; disabling, by the first communication module, the second communication connection with the at least one second electronic device; switching the first communication module from the second working mode to a first working mode; and connecting to the available Internet access point through the first communication module working in the first working mode, such that the Internet is accessed through the available Internet access point; wherein the first communication module cannot work simultaneously in the first working mode and the second working mode.

Another aspect provides a method for transmitting information, applicable to a first electronic device, the first electronic device comprising a first communication module and a second communication module, the method comprising: performing a search through the second communication module to determine whether at least one second electronic device is present; if the presence of the at least one second electronic device is detected by the second communication module, establishing a second communication connection with the at least one second electronic device through the first communication module; and performing information transmission with the at least one second electronic device through the first communication module via the second communication connection.

A further aspect provides a network sharing method applied to a first electronic device, wherein the first electronic device comprises a first communication module and a third communication module, the method comprises: searching for Internet access points existing in a current environment through the first communication module working in a first working mode; determining whether there is an available Internet access point in the found Internet access points; connecting to a mobile communication network through the third communication module to access the Internet via the mobile communication network, if it is determined that there is no available Internet access point in the found Internet access points; and switching the first communication module from the first working mode to a second working mode, so that at least one second electronic device can be connected to the first electronic device, so as to be connected to the mobile communication network and then access the Internet through the first electronic device, wherein the first communication module cannot work in the first working mode and the second working mode at the same time.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
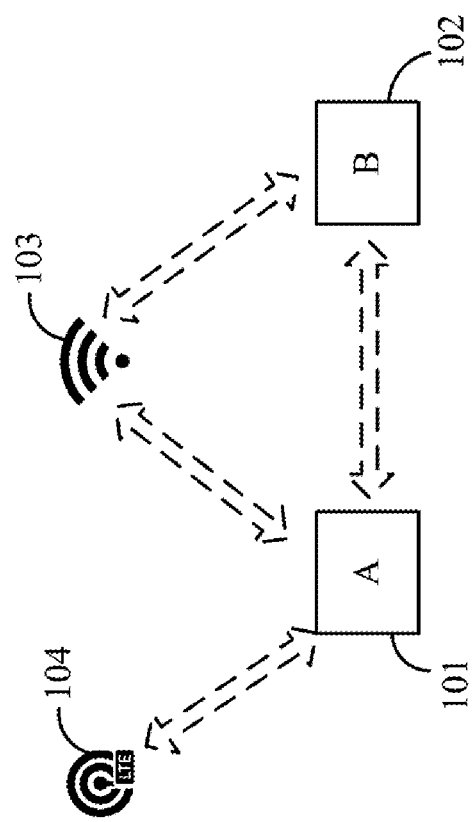
FIG. 1 is a schematic diagram illustrating an example of network sharing between electronic devices according to an embodiment.

FIG. 1 is a schematic diagram illustrating an example of network sharing between electronic devices according to an embodiment. To be specific, FIG. 1 illustrates a first electronic device 101 and a second electronic device 102. The first electronic device 101 and the second electronic device 102 may be respectively a mobile phone, a tablet computer, a laptop computer or any like electronic device. Herein, assume that the first electronic device 101 and the second electronic device 102 have the function of connecting to an adjacent available Wi-Fi access point, for example, as illustrated by 103 in FIG. 1. In addition, assume that the first electronic device 101 further has the function of connecting to a mobile communication network 104, such as a long-term evolution (LTE) network, whereas the second electronic device 102 is incapable of connecting to a mobile communication network. In the context of this specification, for ease of description and differentiation, the first electronic device 101 and the second electronic device 102 are respectively referred to as device A and device B.

As illustrated in FIG. 1, when a Wi-Fi access point 103 is available, the device A and the device B are both capable of accessing the Internet by means of connecting to the Wi-Fi access point 103. However, when the Wi-Fi access point 103 is not available, the device A is capable of connecting to, for example, the mobile communication network 104, to finally access the Internet. However, if the device B also desires to access the Internet, the Wi-Fi hotspot function of the device A needs to be enabled, such that the device B further accesses the Internet by connecting to a Wi-Fi hotspot of the device A.

Figure 10:
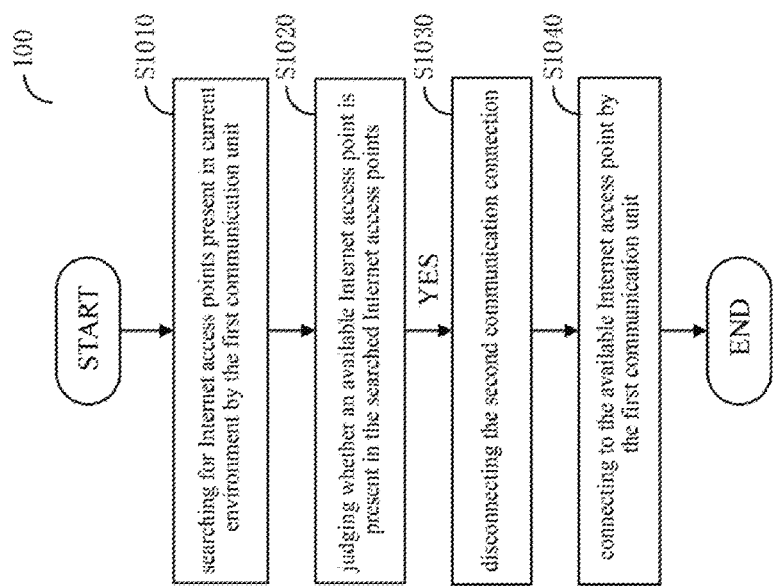
FIG. 10 is a schematic flow diagram illustrating a network sharing method according to another embodiment.

When the device A enables the Wi-Fi hotspot and establishes a Wi-Fi hotspot connection with the device B, the network sharing method 100 as illustrated in FIG. 10 may be used. To be specific, the method 100 as illustrated in FIG. 10 may be applicable to the second electronic device 102 (the device B) as illustrated in FIG. 1. The second electronic device 102 may comprise a first communication unit (for example, a Wi-Fi communication unit). In addition, the second electronic device establishes a second communication connection (for example, a Wi-Fi communication connection) through the first communication unit. That is, the method 100, as illustrated in FIG. 10, is applicable to a scenario where the Wi-Fi communication unit of the device B has established the above Wi-Fi communication connection.

As illustrated in FIG. 10, before the network sharing method 100, according to the embodiment of the present invention, is performed, firstly, in step S1010, Internet access points existing in a current environment are searched through the first communication unit. Then, in step S1020, it is judged whether an available Internet access point exists in the searched Internet access points. In step S1020, if it is judged that an available Internet access point exists in the searched Internet access points, step S1030 of the method 100 is performed. In step S1030, the second communication connection is disabled. Afterwards, in step S1040, the available Internet access point is connected through the first communication unit, such that the Internet is accessed through the available Internet access point. After step S1040 is performed, the method 100 ends.

To be specific, according to the method 100 as illustrated in FIG. 10, when the Wi-Fi communication unit of the device B has established the Wi-Fi communication connection, the device B may still search for the Wi-Fi access points present in the current environment through step S1010, and judge whether an available Internet access point exists in the searched Internet access points through step S1020. Through step S1020, if it is judged that an available Internet access point (for example, a Wi-Fi access point) exists in the searched Internet access points, the Wi-Fi communication unit of the device B may disable the current Wi-Fi communication connection, and instead may be connected to the available access point to access the Internet.

According to the method 100, as illustrated in FIG. 10, according to the embodiments of the present invention, the first communication unit (for example, the Wi-Fi communication unit) of the second electronic device (for example, the device B) is capable of automatically searching for the Internet access points while maintaining the second communication connection, thereby reducing the Internet access cost and improving the user experience. The method 100 as illustrated in FIG. 10 will be described in detail hereinafter.

Figure 11:
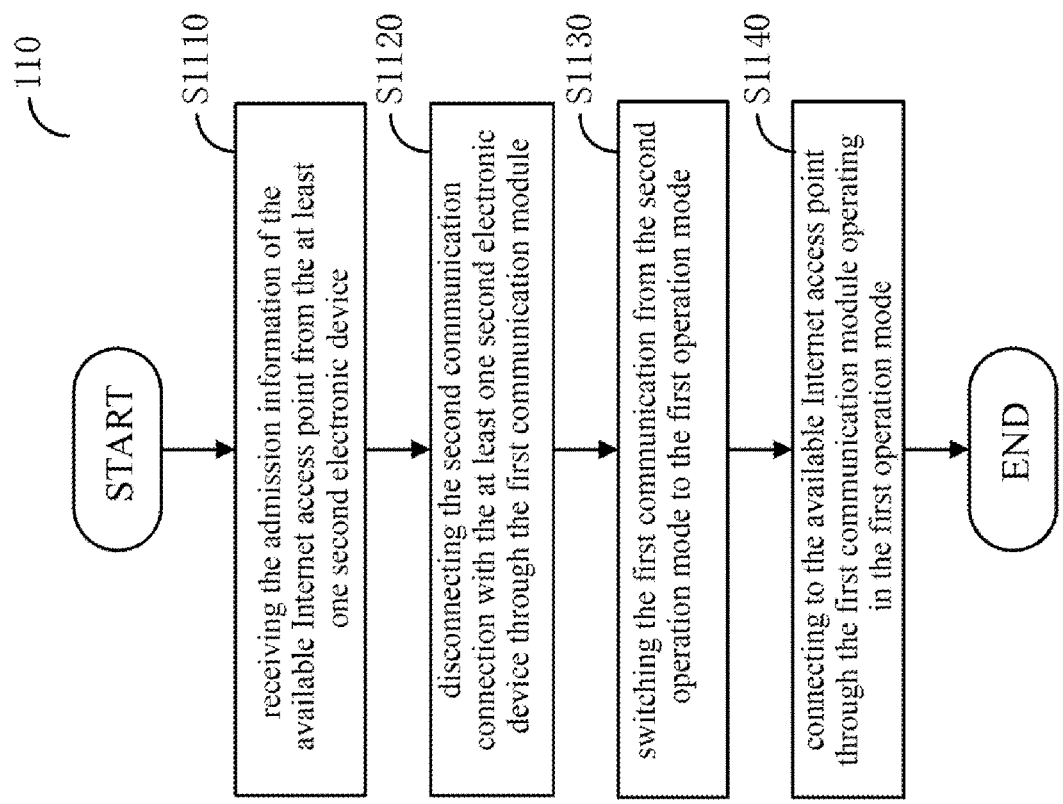
FIG. 11 is a schematic flow diagram illustrating a network sharing method according to still another embodiment.

In addition, the method 110 as illustrated in FIG. 11 may be applicable to the first electronic device 101 (the device A) as illustrated in FIG. 1. The first electronic device 101 may comprise a first communication module. In addition, the first electronic device 101 establishes a second communication connection with at least one second electronic device 102 (the device B) through the first communication module working in a second working mode. The first communication module cannot work simultaneously in the first working mode and the second working mode. To be specific, as described above, the first communication module may be a Wi-Fi hotspot communication module, the first working mode, for example, may correspond to a first wireless communication mode in which the first communication module is able to access an Internet access point, for example the Wi-Fi access point 103 as illustrated in FIG. 1, and the second working mode, for example, may correspond to a second wireless communication mode in which the first communication module works as a network access point (for example, working as a Wi-Fi hotspot).

In addition, the method 110 as illustrated in FIG. 11 is applicable to the following scenario: when the device A has enabled the Wi-Fi hotspot function, that is, working as a Wi-Fi hotspot, and the device B has connected to the Wi-Fi hotspot of the device A; therefore, a Wi-Fi hotspot channel has been established between the device A and the device B.

As illustrated in FIG. 11, before the network sharing method 110, according to the embodiment of the present invention, is performed, firstly, in step S1110, access information of the available Internet access point is received from the at least one second electronic device. The access information is searched by the at least one second electronic device while maintaining the second communication with the first electronic device. That is, the device B may search for an available Internet access point in the current environment while maintaining a Wi-Fi hotspot channel with the device A. In addition, when the device B searches out an available Internet access point, the device B may share the Internet access point with the device A.

Subsequently, in step S1120, the first communication module disables the second communication connection with the at least one second electronic device. Afterwards, in step S1130, the first communication module is switched from the second working mode to a first working mode. Finally, in step S1140, the first electronic device connects to the available Internet access point through the first communication module working in the first working mode, such that the Internet is accessed through the available Internet access point. After step S1140 is performed, the method 110 ends.

To be specific, upon receiving the access information of the current available access point from the device B, the device A may disable the Wi-Fi hotspot connection with the device B, that is, disable the Wi-Fi hotspot function, and switch from the second working mode to the first working mode, such that the device A accesses the available Internet access point based on the received access information, and hence gaining access to the Internet.

With the method 110, as illustrated in FIG. 11, according to the embodiment of the present invention, the device A is capable of acquiring the details of the Internet access point in the case of no searching, and automatically accessing the Internet access point. This reduces the cost of accessing the Internet and improves the user experience. The method 110 as illustrated in FIG. 11 will be described in detail hereinafter.

In addition, according to the present invention, the scenario where the network is shared between electronic devices may be automatically implemented, with no need of manual operations. Hereinafter, an implementation method thereof is described with reference to FIG. 2.

Figure 2:
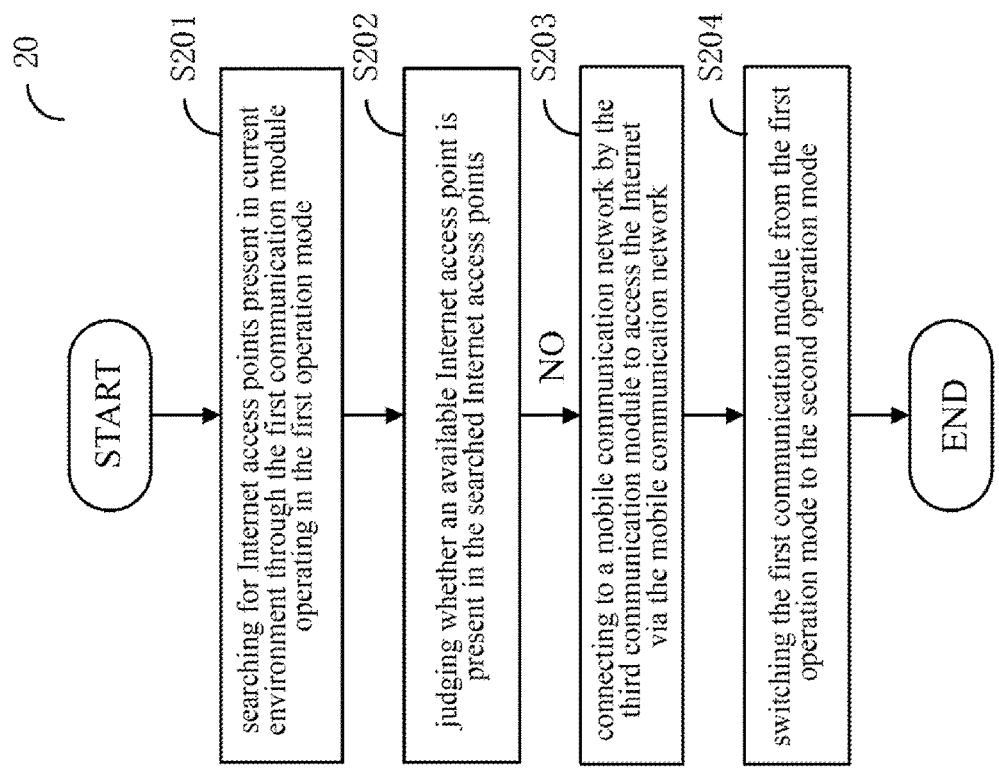
FIG. 2 is a schematic flow diagram illustrating a network sharing method according to one embodiment.

FIG. 2 is a schematic flow diagram illustrating a network sharing method 20 according to one embodiment of the present invention. The method 20 as illustrated in FIG. 2 may be applicable to the first electronic device 101 (the device A) as illustrated in FIG. 1. Herein, although no further illustration is given in FIG. 1, the first electronic device 101 may comprise a first communication module and a third communication module.

To be specific, for example, the first communication module may support a first working mode and a second working mode, wherein the first working mode, for example, may correspond to a first wireless communication mode in which the first communication module is able to access an Internet access point, for example, a Wi-Fi access point as illustrated in FIG. 1 may be connected, and the second working mode, for example, may correspond to a second wireless communication mode in which the first communication module works as a network access point (for example, working as a Wi-Fi hotspot). The third communication module, for example, has the function of connecting to the mobile communication network 104 as illustrated in FIG. 1.

As illustrated in FIG. 2, before the network sharing method 20, according to the embodiment of the present invention, is performed, firstly, in step S201, Internet access points existing in a current environment are searched through the first communication module working in the first working mode. Then, in step S202, it is judged whether an available Internet access point exists in the searched Internet access points.

To be specific, for example, as illustrated in FIG. 1, the above Internet access point refers to an access point through which an electronic device is capable of accessing the Internet, for example, the Wi-Fi access point (or a Wi-Fi router) 103 as illustrated in FIG. 1. Through step S201, the device A may search out a plurality of Internet access points in the current environment, which are not all available. Herein, the "available Internet access point" refers to an Internet access point to which the device A is able to connect, for example, the Wi-Fi access point 103 as illustrated in FIG. 1.

Since steps S201 and S202 in FIG. 2 may be implemented through any suitable search and judgment method well known to a person skilled in the art, but for avoiding confusion in understanding of the inventive concept of the present invention, they are thus not described herein any further.

Subsequently in step S202, if it is judged that no available Internet access point exists in the searched Internet access points, step S203 of the method 20 is performed. In step S203, a mobile communication network is connected through a third communication module, such that the Internet is accessed via the mobile communication network. To be specific, with reference to FIG. 1, as described above, when the Wi-Fi access point 103 is currently not available, the device A may connect to the mobile communication network 104 through a third communication module thereof, to access the Internet via the mobile communication network.

Further, in step S202, if it is judged that no available Internet access point exists in the searched Internet access points, step S204 of the method 20 is performed. In step S204, the first communication module is switched from the first working mode to the second working mode. In this way, the at least one second electronic device 102 is capable of connecting to the first electronic device 101, such that the at least one second electronic device 102 connects to the mobile communication network through the first electronic device 101, and hence access the Internet via the mobile communication network.

To be specific, with reference to FIG. 1, when the device A judges that the Wi-Fi access point 103 is not available in step S202, the device A may switch the first communication module from the first working mode in which the device A connects to the Internet access point to the second working mode in which the first communication module works as a network access point, that is, enabling the Wi-Fi hotspot function. As such, the device B may connect to the Wi-Fi hotspot of the device A, and hence access the Internet through the Wi-Fi hotspot. After step S204 is performed, the method 20 ends.

In addition, in the first electronic device 101, the first communication module cannot work simultaneously in the first working mode and the second working mode. That is, as illustrated in FIG. 1, when the device A working in the first working mode connects to the Wi-Fi access point 103, the device A may not simultaneously enable the Wi-Fi hotspot function. On the contrary, when the device A working in the second working mode acts as a Wi-Fi hotspot for the device B to connect to the above network, the device A may not simultaneously search for the currently available Wi-Fi access point 103, let alone a connection with the Wi-Fi access point 103.

It should be further noted that although FIG. 1 only illustrates one second electronic device 102, the number of second electronic devices is not limited to what is illustrated in FIG. 1. To be specific, when the device A enables the Wi-Fi hotspot function, a plurality of devices B may simultaneously connect to the device A, as long as the devices B pre-acquire such configuration information as the name and access password of the Wi-Fi access point of the device B. As such, the plurality of devices B may simultaneously access the Internet through the Wi-Fi hotspot of the device A.

The steps in the network sharing method 20 according to the embodiment of the present invention are described above with reference to FIG. 1 and FIG. 2. With the above-described network sharing method 20 according to the embodiment of the present invention, automatic network sharing may be implemented between electronic devices, and no manual operations of the user are required, thereby simplifying the user's operations and improving the user experience.

Optionally, although not illustrated in FIG. 1, the first electronic device 101 may further comprise a second communication module. In addition, although not illustrated in FIG. 2, the method may further comprise the step of: establishing a first communication connection with at least one second electronic device 102 through the second communication module. Further, prior to step S204, the method may further comprise the step of: receiving a network support request from the at least one second electronic device 102 through the second communication module via the first communication connection.

To be specific, the second communication module may be, for example, a BLUETOOTH communication module, which is configured to communicate with another electronic device based on the BLUETOOTH communication manner. As illustrated in FIG. 1, a BLUETOOTH channel may be established between the device A and the device B as an information transmission channel there-between. When device B detects a failure to connect to any Internet access point (a Wi-Fi access point) to access the Internet, the device B may request the device A to enable the Wi-Fi hotspot function thereof to access the Internet through the device A, that is, sending a network support request to the device A via the BLUETOOTH channel. When the device A receives the network support request from the device B via the BLUETOOTH channel, step S204 as illustrated in FIG. 2 is performed to enable the Wi-Fi hotspot.

A first communication connection, such as, a BLUETOOTH channel, is established between the device A and the device B to transmit information between the device A and the device B, which may maintain the real-time information interaction between the device A and the device B in the case of low power consumption, and thus further contribute to implementation of the automatic network sharing between the electronic devices. Alternatively, prior to step S204 as illustrated in FIG. 2, the method 20 may also comprise the step of: detecting at least one second electronic device 102 through the second communication module. For example, when detecting the device B via the BLUETOOTH module, the device A enables the Wi-Fi hotspot function through the first communication module for the access of the device B. To be more specific, the BLUETOOTH detection herein signifies that the device A detects that the device B is a known device. For example, the device A and the device B may store in advance the device name of each other. As such, when the device A and the device B are within a BLUETOOTH communication supporting range, the device A may detect the device B via the BLUETOOTH module. If the name of the device B is known by the device A, it is considered that the device A has detected the device B, and step S204 is performed. Alternatively, the device A and the device B may have previously performed BLUETOOTH pairing and/or established a BLUETOOTH channel. In this case, the device A and the device B may generally store the device name of each other. In this way, when the device A and the device B enter the BLUETOOTH communication distance again, the device A detects the device B is a known device.

Compared with the aforementioned optional implementation, in an embodiment, the device A does not need to perform pairing or establish a channel with the device B, and does not need to enable the Wi-Fi hotspot function upon receiving a network support request from the device B based on the channel. Instead, the device A may enable the Wi-Fi hotspot function only when detecting the device B via BLUETOOTH. Accordingly, power consumption is further reduced, and signaling overhead is saved, such that the cost of implementing automatic network sharing between the electronic devices is further reduced.

Further optionally, the first electronic device 101 as illustrated in FIG. 1 may store a first list of known Internet access points, which comprises access information of at least one known Internet access point of the first electronic device 101. In addition, the at least one second electronic device 102 as illustrated in FIG. 1 may store a second list of known Internet access points, which comprises access information of at least one known Internet access point of the at least one second electronic device 102. In addition, although not illustrated in FIG. 2, the method 20 may further comprise a step of carrying out synchronization of the first list of known Internet access point and the second list of known Internet access points with the at least one second electronic device 102.

To be specific, for example, the device A and the device B may respectively store their list of known Wi-Fi access points, and store the access information of the connection, of the name and password of the Wi-Fi access point and the like, such as, a Wi-Fi access point 103, or the like. As such, when detecting that a known Wi-Fi access point stored in a list is present in the vicinity of the device A and the device B, the device A and the device B may use the relevant access information stored in the list to connect to the Wi-Fi access point, so as to access the Internet via the Wi-Fi access point. Whenever acquiring the access information of a new Wi-Fi access point, the device A and device B will store the access information to the list of known Wi-Fi access points. In addition, the device A and device B may further perform synchronization for the list of each other. That is, when acquiring the access information of a Wi-Fi access point which is also unknown by the device B, in addition to storing the access information to the list of known Wi-Fi access points of itself, the device A may also notify the device B of the access information, such that the device B may also store the access information to the lists of known Wi-Fi access points, and vice versa.

Through the above optional step, in addition to implementing automatic network sharing between the device A and the device B, the method 20 as illustrated in FIG. 2 may further provide automatic synchronization of the access information of the Internet access point between the device A and the device B. Hence, network sharing between the device A and the device B may be further facilitated.

Further optionally, although not illustrated in FIG. 2, after the above mentioned synchronization step, the step 20 may also comprise the steps of: switching the first communication module from the second working mode to the first working mode, disabling the connection with the mobile communication network 104 through the third communication module, and connecting to the newly available Internet access point obtained through the preceding mentioned synchronization step S205 through the first communication module working in the first working mode, so as to access the Internet through the newly available Internet access point.

To be specific, still in combination with the example as illustrated in FIG. 1, when the device A cannot connect to the Wi-Fi access point 103, it then connects to the mobile communication network 104 instead, and the Wi-Fi hotspot function is enabled to make the device B access the Internet through the Wi-Fi hotspot function. If the device B acquires new access information, such as the name, password of the Wi-Fi access point and the like, present in a current environment, the device B may send the access information to the device A through the above mentioned synchronization step. After receiving the access information of the Wi-Fi access point from the device B, the device A switches from the second working mode working as the Wi-Fi hotspot to the first working mode in which the device A is connected to the Wi-Fi access point, disables the connection with the mobile communication network 104 through the third communication module, and connects to the Wi-Fi access point obtained through the preceding mentioned synchronization step through the first communication module, so as to access the Internet through the Wi-Fi access point. Analogously, the device B may also be connected to the Wi-Fi access point to access the Internet after performing Wi-Fi access point information synchronization with the device A.

In addition, prior to connecting to the Wi-Fi access point obtained through the preceding mentioned synchronization step through the first communication module, the search and judgment steps in steps S201 and S202 as illustrated in FIG. 2 may be also included. To be specific, after switching to the first working mode again in which the device A connects to the Wi-Fi access point, the device A searches for Internet access points existing in the current environment again, and judges whether an available Internet access point exists in the searched Internet access points. In this case, since the device A has already acquired access information of a newly available Internet access point from the device B, in the judgment step, it is judged that an available Internet access point exists, the device A connects to the newly available Internet access point.

Further optionally, the above-described optional synchronization step may specifically comprise the step of: synchronizing, by the second communication module, the first list of known Internet access points and the second list of known Internet access points with the at least one second electronic device 102 via the first communication connection. That is, synchronization of the access information of the known Internet access points may be carried out between the device A and the device B via the first communication connection, for example, the BLUETOOTH channel.

To be specific, the above optional step of using the first communication connection may specifically comprise: receiving, by the second communication module (for example, the BLUETOOTH communication module), the access information of the new Internet access point from at least one second electronic device 102 via the first communication connection (for example, the BLUETOOTH channel); and adding the access information of the new Internet access point to the first list of known Internet access points. This corresponds to the scenario where the device A as illustrated in FIG. 1 connects to the mobile communication network 104 and enables the Wi-Fi hotspot function and then receives information of a new Internet access point from the device B via, for example, a BLUETOOTH channel.

In addition, although not illustrated in FIG. 1, there is also a case where when the device A reacquires related information of a Wi-Fi access point unknown to the device B. In this case, the above optional step may specifically comprise: acquiring the access information of the new Internet access point; adding the access information of the new Internet access point to the first list of known Internet access points; and sending, by the second communication module (for example, the BLUETOOTH communication module), the access information of the new Internet access point to at least one second electronic device 102 via the first communication connection (for example, the BLUETOOTH channel).

Since the above first communication connection is constantly maintained as long as the device A and the device B are in a communication supporting range, each time the device A or the device B acquires access information of a new Internet access point, the acquired access information may be notified to the device B or the device A in real time. Hence, real-time information synchronization may be carried out between the device A and the device B in the case of low power consumption, which further facilitates the automatic network sharing between the electronic devices.

Alternatively, the above-described synchronization step may not be implemented through the first communication connection, for example, the BLUETOOTH channel, but another channel, e.g., the Wi-Fi hotspot channel may be used to perform the synchronization. It should be noted that, e.g., each time when the second communication connection is established between the device A and the device B to carry out synchronization of the lists of known Internet access points, the device A or the device B may judge, according to the result of a previous synchronization, whether to send the access information of the newly acquired Internet access point to the device B or the device A.

In addition, optionally, although not illustrated in FIG. 2, the method 20 may further comprise the step of: pre-storing the first list of known Internet access points. In addition, step S202 may specifically comprise the step of: comparing the searched Internet access points with the known Internet access points in the first list of known Internet access points; and if at least one Internet access point exists in the searched Internet access points which is the same as the known Internet access points in the first list of known Internet access points, judging that an available Internet access point in the searched Internet access points, and otherwise, judging that no available Internet access point exists in the searched Internet access points.

Another embodiment of the present invention is described with reference to FIG. 1 and FIG. 3. Although not illustrated in FIG. 1, the second electronic device 102 may comprise a first communication unit. To be specific, for example, the first communication unit may support at least a first working mode also supported by the first communication module of the first electronic device 101. That is, the first working mode, for example, may correspond to a first wireless communication mode in which the first communication unit is able to access an Internet access point, for example, the Wi-Fi access point as illustrated in FIG. 1. However, different from the first communication module of the first electronic device 101, the first communication unit of the second electronic device 102 merely works in the first working mode.

In addition, it is assumed that the first electronic device 101 works as an access point, and connects to the mobile communication network 104 to further access the Internet. To be specific, for example, as illustrated in FIG. 1 and as described above, in the case of a failure to connect to the Wi-Fi access point 103, the device A connects to the mobile communication network 104 and enables the Wi-Fi hotspot function.

Figure 3:
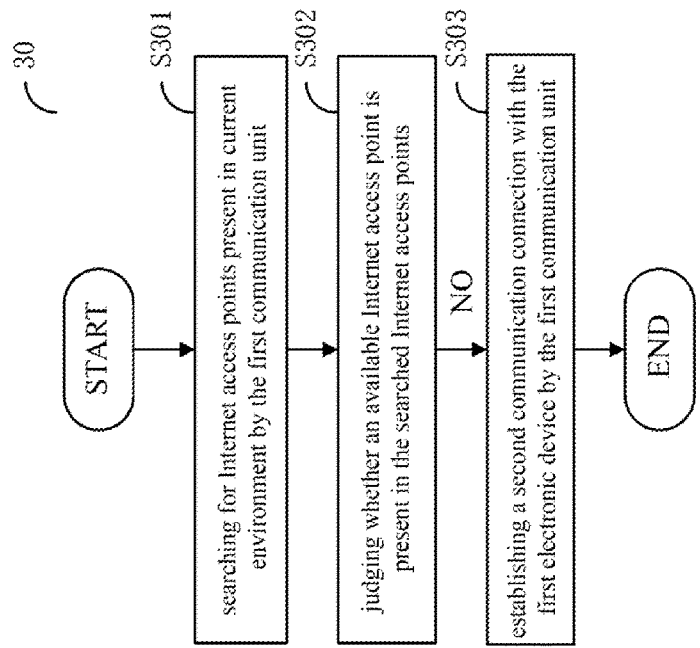
FIG. 3 is a schematic flow diagram illustrating a network sharing method according to another embodiment.

As illustrated in FIG. 3, before the network sharing method 30, according to the embodiment of the present invention, is performed, firstly, in step S301, Internet access points existing in a current environment are searched through the first communication unit. Then, in step S302, it is judged whether an available Internet access point exists in the searched Internet access points.

Steps S301 and S302 may be the same as steps S201 and S202 performed by the first electronic device 101 as illustrated in FIG. 2. In addition, steps S301 and S302 in FIG. 3 may also be implemented through any suitable search and judgment method well known to a person skilled in the art.

Subsequently, in step S302, if it is judged that no available Internet access point exists in the searched Internet access points, step S303 of the method 30 is performed. In step S303, a second communication connection is established with the first electronic device 101 through the first communication units, such that the Internet is accessed via the second communication connection. After step S303 is performed, the method 30 ends.

Similar to the above-described situations, the method 30 for may include different communication techniques or channels as well as synchronization steps and/or powering down of components.

Figure 4:
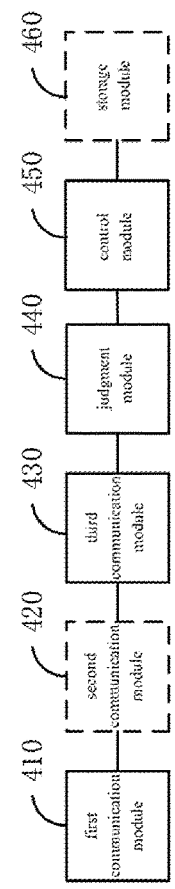
FIG. 4 is a schematic structural block diagram illustrating a first electronic device according to yet another embodiment.

With reference to FIG. 4, a first electronic device 400 according to another embodiment of the present invention is described. FIG. 4 is a schematic structural block diagram illustrating the first electronic device 400 according to another embodiment. As illustrated in FIG. 4, the first electronic device 400 may comprise: a first communication module 410, a third communication module 430, a judging module 440 and a control module 450.

The first communication module 410 works in the first working mode to search for Internet access points existing in a current environment. The judging unit 440 judges whether an available Internet access point exists in the Internet access points searched out by the first communication module 410. If the judging module 440 judges that no available Internet access point exists in the Internet access point searched by the first communication module 410, the third communication module 430 connects to a mobile communication network to access the Internet via the mobile communication network. In addition, if the judging module 440 judges that no available Internet access point exists in the Internet access point searched by the first communication module 410, the control module 450 switches the first communication module 410 from the first working mode to a second working mode, such that at least one second electronic device is able to connect to the first electronic device 400 to access the mobile communication network through the first electronic device 400, to further access the Internet via the mobile communication network. The first communication module 410 works either in the first working mode or the second working mode, but not in the two modes simultaneously.

Optionally, as illustrated by the dotted-line block in FIG. 4, the first electronic device 400 may further comprise: a second communication module 420, which establishes a first communication connection with the at least one second electronic device. In addition, before the control module 450 switches the first communication module 410 from the first working mode to the second working mode, the second communication module 420 receives a network support request from the at least one second electronic device via the first communication connection.

Alternatively, as illustrated by the dotted-line block in FIG. 4, the first electronic device 400 may further comprise: a second communication module 420, which detects the at least one second electronic device before the control module 450 switches the first communication module 410 from the first working mode to the second working mode.

Further optionally, as illustrated by the dotted-line block in FIG. 4, the first electronic device 400 may further comprise a storage module 460 storing a first list of known Internet access points, which comprises access information of at least one known Internet access point of the first electronic device. In addition, at least one second electronic device may store a second list of known Internet access points, which comprises access information of at least one known Internet access point of the at least one second electronic device. In addition, the first electronic device 400 carries out synchronization of the first list of known Internet access points and the second list of known Internet access points with the at least one second electronic device.

It should be noted that the first electronic device 400 as illustrated in FIG. 4 may correspond to the first electronic device 101 (the device A) as illustrated in FIG. 1, and the first electronic device 400 may perform various steps (including any optional step) of the method 20 as illustrated in FIG. 2. Therefore, with the first electronic device 400 as illustrated in FIG. 4 according to the embodiment, automatic network sharing may be implemented between electronic devices, and no manual operations of the user are required, thereby simplifying the user's operations and improving the user experience.

Figure 5:
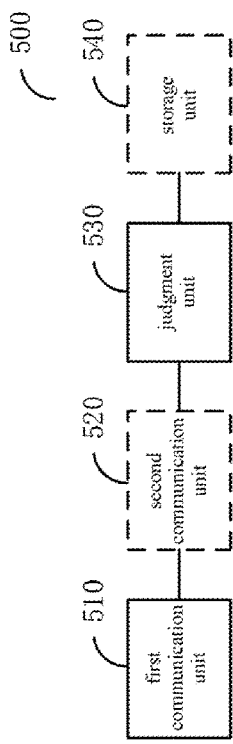
FIG. 5 is a schematic structural block diagram illustrating a second electronic device according to still another embodiment.

With reference to FIG. 5, a second electronic device 500 according to another embodiment of the present invention is described. FIG. 5 is a schematic structural block diagram illustrating the second electronic device 500 according to another embodiment. As illustrated in FIG. 5, the second electronic device 500 may comprise a first communication unit 510 and a judging unit 530.

The first communication unit 510 searches for Internet access points existing in a current environment. The judging unit 530 judges whether an available Internet access point exists in the Internet access points searched out by the first communication unit 510. In addition, if the judging module 530 judges that no available Internet access point exists in the Internet access points searched by the first communication unit 510, the first communication unit 510 establishes a second communication with the first electronic device, such that the Internet is accessed via the second communication connection. In addition, the first electronic device works as an access point, and connects to the mobile communication network to further access the Internet.

Optionally, as illustrated by the dotted-line block in FIG. 5, the second electronic device 500 may further comprise: a second communication unit 520, which establishes a first communication connection with the first electronic device before the second communication connection is established between the first communication unit 510 and the first electronic device. In addition, the second communication unit 520 sends a network support request to the first electronic device via the first communication connection.

Alternatively, the first electronic device comprises a second communication module not for the second communication connection, and the first electronic device detects, through the second communication module, that the second electronic device 500 works as a network access point.

Further optionally, as illustrated by the dotted-line block in FIG. 5, the second electronic device 500 may further comprise a storage unit 540 storing a second list of known Internet access points, which comprises access information of at least one known Internet access point of the second electronic device. In addition, the first electronic device may store a first list of known Internet access points, which comprises access information of at least one known Internet access point of the first electronic device. In addition, if the judging unit 530 judges that an available Internet access point in the searched Internet access points, synchronization of a first list of known Internet access points and a second list of known Internet access points is carried out between the second electronic device 500 and the first electronic device.

It should be noted that the second electronic device 500 as illustrated in FIG. 5 may correspond to the second electronic device 102 (the device B) as illustrated in FIG. 1, and the second electronic device 500 may perform various steps (including any optional step) of the method 30 as illustrated in FIG. 3. Therefore, with the second electronic device 500 as illustrated in FIG. 5 according to the embodiment, automatic network sharing may be implemented between electronic devices, and no manual operations of the user are required, thereby simplifying the user's operations and improving the user experience.

It should be noted that the first electronic device may correspond to the first electronic device 101 (the device A) as illustrated in FIG. 1 or the first electronic device 400 as illustrated in FIG. 4, and the first electronic device may perform various steps (including any optional step) of the method 20 as illustrated in FIG. 2. In addition, the second electronic device may correspond to the second electronic device 102 (the device B) as illustrated in FIG. 1 or the second electronic device 500 as illustrated in FIG. 5, and the second electronic device may perform various steps (including any optional step) of the method 30 as illustrated in FIG. 3.

Figure 6:
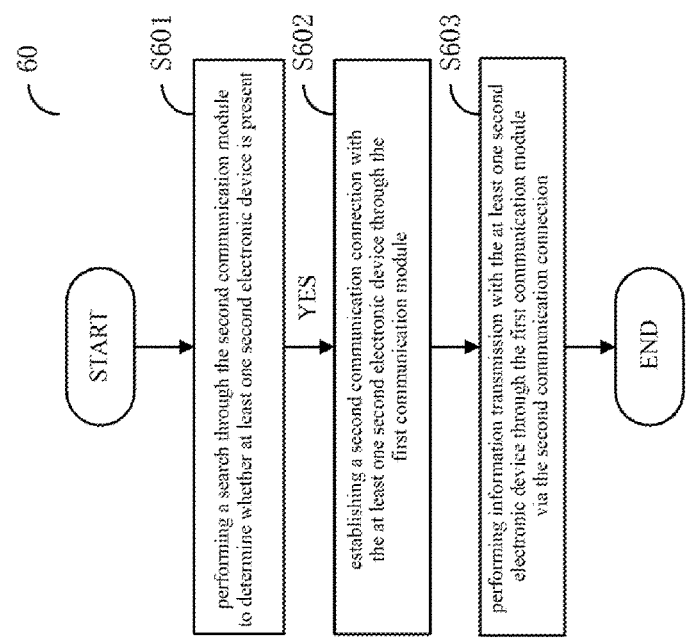
FIG. 6 is a schematic flow diagram illustrating a method for transmitting information according to another embodiment.

FIG. 6 is a schematic flow diagram illustrating a method 60 for transmitting information according to another embodiment. The method 60 may be, for example, applicable to a first electronic device (for example, the device A as illustrated in FIG. 1), wherein the first electronic device, for example, may comprise a first communication module and a second communication module.

As illustrated in FIG. 6, before performing the network sharing method 60 according to the embodiments of the present invention, firstly, in step S601, it is searched through the second communication module whether at least one second electronic device is present. Subsequently, if in step S601, the second communication module detects that at least one second electronic device is present, and steps S602 and S603 of the method 60 are performed. To be specific, in step S602, a second communication connection is established with the at least one second electronic device through the first communication module. Subsequently, in step S603, information is transmitted between the first electronic device and the at least one second electronic device through the first communication module via the second communication connection. After step S603 is performed, the method 60 ends. The device A and the device B as illustrated in FIG. 1 may be the first and second electronic devices of method 60, as an example.

A method 70 for transmitting information according to another embodiment is described with reference to FIG. 1 and FIG. 7. The method 70 may be applicable to the second electronic device (for example, the device B as illustrated in FIG. 1), and the second electronic device comprises a first communication unit.

Figure 7:
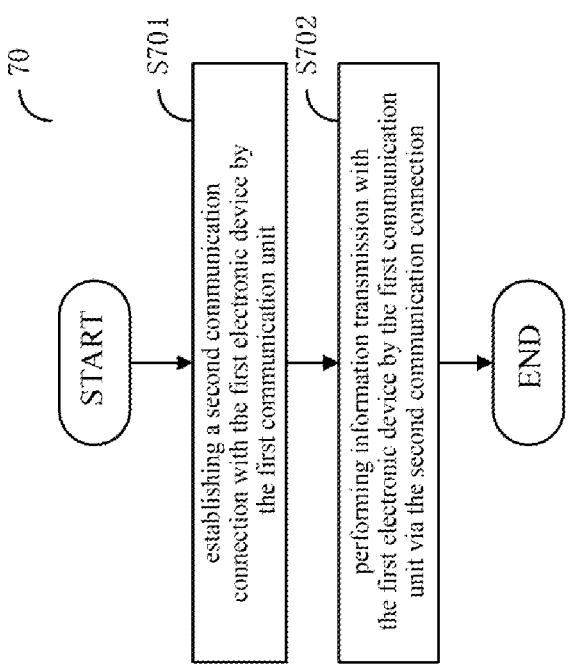
FIG. 7 is a schematic flow diagram illustrating a method for transmitting information according to yet another embodiment.

As illustrated in FIG. 7, before the method 70 for transmitting information according to the embodiment is performed, firstly, in step S701, a second communication connection is established with a first electronic device through the first communication unit. Subsequently, in step S702, information is transmitted between the first electronic device and the second electronic device through the first communication module via the second communication connection. The first electronic device comprises a second communication module, which is not used for the second communication connection, and the second communication connection is established based on detecting the second electronic device by the second communication module of the first electronic device.

To be specific, for ease of understanding, the method 70 is described in detail still using the device A and the device B as illustrated in FIG. 1 as examples. Similar to the above embodiments, the first communication unit may be, for example, a Wi-Fi communication unit configured to connect to a Wi-Fi access point. The second communication module of the first electronic device may be, for example, a BLUETOOTH communication module. That is, based on that the device A detects the device B through a BLUETOOTH communication module thereof, the device B establishes the a second communication connection, for example, a Wi-Fi hotspot channel, with the device A through step S701, and the device B may transmit information to the device A via the second communication connection.

It should be understood that the first electronic device and the second electronic device may, for example, respectively correspond to the device A and the device B as illustrated in FIG. 1, and may respectively perform various steps (including any optional step) of the method 60 as illustrated in FIG. 6 and the method 70 as illustrated in FIG. 7, therefore they are not described herein any further.

Figure 8:
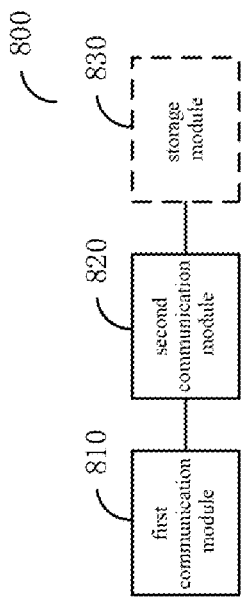
FIG. 8 is a schematic structural block diagram illustrating a first electronic device according to still another embodiment.

FIG. 8 is a schematic structural block diagram illustrating the first electronic device 800 according to still another embodiment. As illustrated in FIG. 8, the first electronic device 800 may comprise a first communication module 810 and a second communication module 820.

To be specific, the second communication module 820 searches whether at least one second electronic device. If the second communication module 820 searches out at least one second electronic device, the first communication module 810 establishes a second communication connection with the at least one second electronic device, and transmits information with the at least second electronic device via the second communication connection.

Optionally, as illustrated by the dotted-line block in FIG. 8, the first electronic device 800 may further comprise a storage module 830 storing a first list of known Internet access points, which comprises access information of at least one known Internet access point of the first electronic device. In addition, at least one second electronic device may store a second list of known Internet access points, which comprises access information of at least one known Internet access point of the at least one second electronic device. In addition, the first communication module 810 further carries out synchronization of the first list of known Internet access points and the second list of known Internet access points with the at least one second electronic device via the second communication connection.

It should be understood that the first electronic device 800 as illustrated in FIG. 8 may correspond to the first electronic device 101 (the device A) as illustrated in FIG. 1, and the first electronic device 800 may perform various steps (including any optional step) of the method 60 as illustrated in FIG. 6. Therefore, with the first electronic device 800 according to the embodiment of the present invention, various information may be transmitted between the electronic devices without establishment of a dedicated communication channel, for example, a BLUETOOTH channel between electronic devices. Therefore, the power consumption may be reduced and the information transmission efficiency may be improved.

Figure 9:
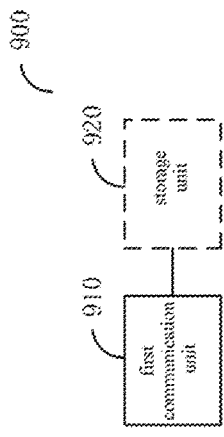
FIG. 9 is a schematic structural block diagram illustrating a second electronic device according to another embodiment.

FIG. 9 is a schematic structural block diagram illustrating the second electronic device 900 according to still another embodiment. As illustrated in FIG. 9, the first electronic device 900 may comprise a first communication unit 910.

To be specific, the first communication unit 910 establishes a second communication connection with a first electronic device, and transmits information with the first electronic device via the second communication connection. The first electronic device comprises a second communication module, which is not used for the second communication connection, and the second communication connection is established based on detecting the second electronic device by the second communication module of the first electronic device.

Optionally, as illustrated by the dotted-line block in FIG. 9, the second electronic device 900 may further comprise a storage unit 920 storing a second list of known Internet access points, which comprises access information of at least one known Internet access point of the second electronic device. In addition, the first electronic device may store a first list of known Internet access points, which comprises access information of at least one known Internet access point of the first electronic device. In addition, the first communication unit 910 further carries out synchronization of the first list of known Internet access points and the second list of known Internet access points with the first electronic device via the second communication connection.

It should be understood that the second electronic device 900 as illustrated in FIG. 9 may correspond to the second electronic device 102 (the device B) as illustrated in FIG. 1, and the second electronic device 900 may perform various steps (including any optional step) of the method 70 as illustrated in FIG. 7.

FIG. 10 is a schematic flow diagram illustrating the network sharing method 100 according to still another embodiment. The method 100 as illustrated in FIG. 10 may be applicable to a second electronic device. The second electronic device comprises a first communication unit. In addition, the second electronic device establishes a second communication connection through the first communication unit.

As illustrated in FIG. 10, before the network sharing method 100 according to the embodiments is performed, firstly, in step S1010, Internet access points present in a current environment are searched through the first communication unit. Then, in step S1020, it is judged whether an available Internet access point exists in the searched Internet access points. In step S1020, if it is judged that an available Internet access point exists in the searched Internet access points, step S1030 of the method 100 is performed. In step S1030, the second communication connection is disabled. Afterwards, in step S1040, the available Internet access point is connected through the first communication unit, such that the Internet is accessed through the available Internet access point. After step S1040 is performed, the method 100 ends.

FIG. 11 is a schematic flow diagram illustrating the network sharing method 110 according to yet still another embodiment. The method 110 as illustrated in FIG. 11 may be applicable to a first electronic device. The first electronic device may comprise a first communication module. In addition, the first electronic device establishes a second communication connection with at least one second electronic device through the first communication module working in a second working mode. The first communication module cannot work simultaneously in the first working mode and the second working mode.

To be specific, still using the specific example as illustrated in FIG. 1 as an example, the first electronic device may be, for example, the first electronic device 101 (the device A) as illustrated in FIG. 1, and the second electronic device may be, for example, the second electronic device 102 (the device B) as illustrated in FIG. 1.

As illustrated in FIG. 11, before the network sharing method 110 according to the embodiment is performed, firstly, in step S1110, access information of the available Internet access point is received from the at least one second electronic device. The access information is searched by the at least one second electronic device while maintaining the second communication with the first electronic device. That is, the device B may search for an available Internet access point in the current environment while maintaining a Wi-Fi hotspot channel with the device A. In addition, when the device B searches out an available Internet access point, the device B may share the Internet access point with the device A.

Subsequently, in step S1120, the first communication module disables the second communication connection with the at least one second electronic device. Afterwards, in step S1130, the first communication module is switched from the second working mode to a first working mode. Finally, in step S1140, the first electronic device connects to the available Internet access point through the first communication module working in the first working mode, such that the Internet is accessed through the available Internet access point. After step S1140 is performed, the method 110 ends.

Figure 12:
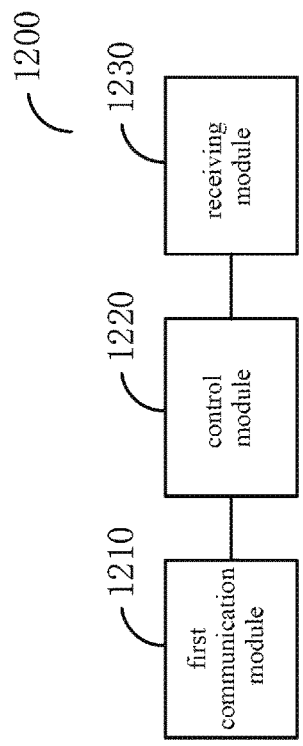
FIG. 12 is a schematic structural block diagram illustrating a first electronic device according to yet another embodiment.

FIG. 12 is a schematic structural block diagram illustrating the first electronic device 1200 according to still another embodiment. As illustrated in FIG. 12, the first electronic device 1200 may comprise: a first communication module 1210, a control module 1220 and a receiving module 1230.

To be specific, the first communication module 1210 works in a second working mode and establishes a second communication with at least one second electronic device. The receiving module 1230 receives access information of an available Internet access point from the at least one second electronic device, wherein the access information is searched by the at least one second electronic device while maintaining the second communication with the first electronic device. The first communication module 1210 further disables the second communication connection with the at least one second electronic device. The control module 1220 switches the first communication module 1210 from the second working mode to a first working mode. In addition, the first communication module 1210 works in the first working mode and connects to the available Internet access point, such that the first communication module 1210 accesses the Internet through the available Internet access point. The first communication module 1210 works either in the first working mode or the second working mode, but not in the two modes simultaneously.

It should be understood that the first electronic device 1200 as illustrated in FIG. 12 may correspond to the first electronic device 101 (the device A) as illustrated in FIG. 1, and the first electronic device 1200 may perform various steps (including any optional step) of the method 110 as illustrated in FIG. 11.

Figure 13:
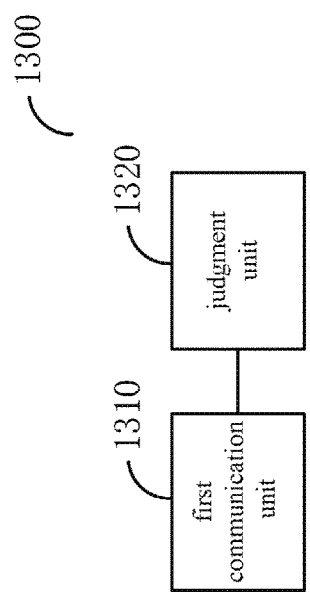
FIG. 13 is a schematic structural block diagram illustrating a second electronic device according to still another embodiment.

FIG. 13 is a schematic structural block diagram illustrating the second electronic device 1300 according to yet still another embodiment. As illustrated in FIG. 13, the second electronic device 1300 comprises a first communication unit 1310 and a judging unit 1320.

To be specific, the first communication unit 1310 establishes a second communication connection and searches for Internet available access points existing in a current environment. The judging unit 1320 judges whether an available Internet access point exists in the searched Internet access points. In addition, if the judging unit 1320 judges that an available Internet access point exists in the searched Internet access points, the first communication unit 1310 disables the second communication connection and connects to the available Internet access point, such that the Internet is accessed through the available Internet access point.

It should be understood that the second electronic device 1300 as illustrated in FIG. 13 may correspond to the second electronic device 102 (the device B) as illustrated in FIG. 1, and the second electronic device 1300 may perform various steps (including any optional step) of the method 100 as illustrated in FIG. 10.

According to the above embodiments, a person skilled in the art may clearly understand that the embodiments may be implemented by means of hardware or by means of software coupled with a necessary general hardware platform. Based on such understanding, the technical solutions of the present invention that contribute to the prior art may be embodied in whole or in part in the form of a software product, the computer software product may be stored in a storage medium or device, such as a ROM/RAM, a magnetic disk, and a CD-ROM, including several instructions for causing a computer or device (e.g., a personal computer, a server, or network equipment) to perform the various embodiments, or certain portions of the methods of the embodiments. For the purpose of this specification, a storage device is non-transitory and a non-transitory storage device includes all storage media except signal media.

In the embodiments, units/modules may be implemented by means of software, such that the units/modules are practiced by various processors. For example, an identified executable code module may comprise one or a plurality of physical or logic blocks of computer instructions, for example, which may construct one or more objects, processes or functions. However, the executable codes of the identified module do not need to be arranged physically together, but may comprise various instructions stored at different locations. When these instructions are logically combined, the units/modules are constructed and the specified objectives of the units/modules are implemented, e.g., by a processor.

The units/modules are implemented by software may be implemented by constructing corresponding hardware circuits to implement the corresponding functions. The hardware circuits comprise common very large scale integrated (VLSI) circuits, or gate arrays and conventional semiconductors such as logic chips, transistors and the like, or other discrete elements. The modules may also be implemented by programmable hardware devices, such as, field-programmable gate arrays, programmable gate logic arrays, programmable logic devices and the like.

Although the embodiments have been described in detail herein using examples, and the examples are provided only to help in understanding the embodiments and should not be construed as limiting the claims. Persons of ordinary skill in the art may make modification or variations to the specific embodiments or application scopes according to the disclosure. In conclusion, this specification shall not be understood as limiting the scope of the claims.

What is claimed is:

1. A network sharing method, applicable to a first electronic device, the first electronic device comprising a first communication module, wherein the first electronic device, working in a second working mode, establishes a second communication connection with at least one second electronic device through the first communication module, wherein through the second communication connection the at least one second electronic device is provided access to online content via a wireless cellular network connected to by the first electronic device, and the method comprising:

receiving, without searching by the first electronic device, access information of an available Wi-Fi Internet access point from the at least one second electronic device, wherein the access information is searched by the at least one second electronic device while maintaining the second communication with the first electronic device;

disabling, responsive to receiving the access information from the at least one second electronic device and by the first communication module, the second communication connection with the at least one second electronic device;

switching the first communication module from the second working mode to a first working mode, wherein the first working mode enables access to online content via the available Wi-Fi Internet access point; and automatically connecting, without receiving user input, to the available Wi-Fi Internet access point through the first communication module working in the first working mode, such that the Internet is accessed through the available Internet access point;

wherein the first communication module cannot work simultaneously in the first working mode and the second working mode;

wherein the at least one second electronic device cannot independently connect to the wireless cellular network.

2. The method according to claim 1, wherein the receiving access information of an available Internet access point from the at least one second electronic device comprises:

receiving, by the first communication module working in the second working mode via the second communication connection, the access information of the available Internet access point from the at least one second electronic device.

3. The method according to claim 1, wherein the first electronic device further comprises a second communication module, and the method further comprises:

establishing a first communication connection with the at least one second electronic device through the second communication module; and the receiving access information of an available Internet access point from the at least one second electronic device comprises:

receiving, by the second communication module via the first communication connection, the access information of the available Internet access point from the at least one second electronic device.

4. A method for transmitting information, applicable to a first electronic device, the first electronic device comprising a first communication module and a second communication module, the method comprising:

performing a search through the second communication module to determine whether at least one second electronic device is present;

if the presence of the at least one second electronic device is detected by the second communication module, establishing, working in a second working mode, a second communication connection with the at least one second electronic device through the first communication module, wherein through the second communication connection the at least one second electronic device is provided access to online content via a wireless cellular network connected to by the first electronic device; and performing information transmission with the at least one second electronic device through the first communication module via the second communication connection;

disabling, responsive to receiving the information transmission from the at least one second electronic device, the second communication connection; and automatically connecting, without receiving user input, to an available Wi-Fi Internet access point through the first communication module working in a first working mode;

wherein the at least one second electronic device cannot independently connect to the wireless cellular network.

5. The method according to claim 4, wherein the first electronic device stores a first known Internet access point list containing admission information of at least one Internet access point known to the first electronic device, and the at least one second electronic device stores a second known Internet access point list containing admission information of at least one Internet access point known to the at least one second electronic device, and wherein performing the information transmission with the at least one second electronic device through the first communication module via the second communication connection comprises:

performing synchronization of the first known Internet access point list and the second known Internet access point list with the at least one second electronic device through the first communication module via the second communication connection.

6. The method according to claim 5, wherein the first communication module has a first operation mode and a second operation mode, and cannot operate in the first operation mode and the second operation mode simultaneously, and wherein establishing the second communication connection with the at least one second electronic device through the first communication module comprises:

establishing the second communication connection with the at least one second electronic device through the first communication module operating in the second operation mode.

7. The method according to claim 4, wherein performing the information transmission with the at least one second electronic device through the first communication module via the second communication connection comprises:

transmitting data for interaction between the at least one second electronic device and the Internet between the first communication module and the at least one second electronic device via the second communication connection.

8. The method according to claim 7, wherein the first communication module has a first operation mode and a second operation mode, and cannot operate in the first operation mode and the second operation mode simultaneously, and wherein establishing the second communication connection with the at least one second electronic device through the first communication module comprises:

establishing the second communication connection with the at least one second electronic device through the first communication module operating in the second operation mode.

9. The method according to claim 8, wherein before performing the search through the second communication module to determine whether the at least one second electronic device is present, the method further comprises:

searching for Internet access points present in the current environment through the first communication module operating in the first operation mode; and judging that an available Internet access point is present in the detected Internet access points; and wherein before the establishing the second communication connection with the at least one second electronic device through the first communication module, the method further comprises:
  checking whether the available Internet access point is known to the at least one second electronic device; and
  if the available Internet access point is unknown to the at least one second electronic device, switching the first communication module from the first operation mode to the second operation mode.

10. A network sharing method applied to a first electronic device, wherein the first electronic device comprises a first communication module and a third communication module, the method comprises:
  searching for Wi-Fi Internet access points existing in a current environment through the first communication module working in a first working mode, wherein the first working mode enables access to online content via an available wireless Internet access point;
  determining whether there is an available Wi-Fi Internet access point in the found Wi-Fi Internet access points;
  connecting to a cellular communication network through the third communication module to access the Internet via the cellular communication network, if it is determined that there is no available Wi-Fi Internet access point in the found Internet access points;
  switching the first communication module from the first working mode to a second working mode, so that at least one second electronic device can be connected to the first electronic device, wherein through the second working mode the at least one second electronic device is provided access to online content via a wireless cellular network connected to by the first electronic device;
  disabling, responsive to receiving access information regarding the available Wi-Fi Internet access point from the at least one second electronic device, the connection between the first electronic device and the at least one second electronic device; and
  automatically connecting, without receiving user input, the first electronic device to the available Wi-Fi Internet access point through the first communication module;
  wherein the first communication module cannot work in the first working mode and the second working mode at the same time;
  wherein the at least one second electronic device cannot connect to the wireless cellular network.

11. The method according to claim 10, wherein the first electronic device further comprises a second communication module, and
  the method further comprises:
  establishing a first communication connection with the at least one second electronic device through the second communication module; and
  before switching the first communication module from the first working mode to the second working mode, the method further comprises:
  receiving, by the second communication module, a network support request from the at least one second electronic device via the first communication connection.

12. The method according to claim 11, wherein the first electronic device stores a first known Internet access point list containing admission information of at least one Internet access point known by the first electronic device, and the at least one second electronic device stores a second known Internet access point list containing admission information of at least one Internet access point known by the at least one second electronic device;
  the method further comprising:
  performing synchronization of the first known Internet access point list and the second known Internet access point list with the at least one second electronic device.

13. The method according to claim 10, wherein the first electronic device further comprises a second communication module; and
  before switching the first communication module from the first working mode to the second working mode, the method further comprises:
  discovering the at least one second electronic device through the second communication module.

14. The method according to claim 13, wherein the first electronic device stores a first known Internet access point list containing admission information of at least one Internet access point known by the first electronic device, and the at least one second electronic device stores a second known Internet access point list containing admission information of at least one Internet access point known by the at least one second electronic device;
  the method further comprising:
  performing synchronization of the first known Internet access point list and the second known Internet access point list with the at least one second electronic device.

15. The method according to claim 10, wherein the first electronic device stores a first known Internet access point list containing admission information of at least one Internet access point known by the first electronic device, and the at least one second electronic device stores a second known Internet access point list containing admission information of at least one Internet access point known by the at least one second electronic device;
  the method further comprising:
  performing synchronization of the first known Internet access point list and the second known Internet access point list with the at least one second electronic device.

* * * * *